United States Patent
Witkowski et al.

(10) Patent No.: US 6,775,662 B1
(45) Date of Patent: Aug. 10, 2004

(54) GROUP PRUNING FROM CUBE, ROLLUP, AND GROUPING SETS

(75) Inventors: Andrew Witkowski, Foster City, CA (US); Tolga Bozkaya, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 406 days.

(21) Appl. No.: 09/863,236

(22) Filed: May 21, 2001

(51) Int. Cl.[7] .............................................. G06F 17/30
(52) U.S. Cl. ....................... 707/3; 707/3; 707/2; 707/5
(58) Field of Search ..................................... 707/2, 3, 5

(56) References Cited

U.S. PATENT DOCUMENTS

| | | | | |
|---|---|---|---|---|
| 5,412,804 A | * | 5/1995 | Krishna | 707/2 |
| 5,428,737 A | * | 6/1995 | Li et al. | 707/4 |
| 5,598,559 A | * | 1/1997 | Chaudhuri | 707/2 |
| 5,991,754 A | * | 11/1999 | Raitto et al. | 707/2 |
| 6,370,524 B1 | * | 4/2002 | Witkowski | 707/3 |
| 6,496,819 B1 | * | 12/2002 | Bello et al. | 707/3 |
| 6,574,623 B1 | * | 6/2003 | Leung et al. | 707/5 |
| 2003/0093407 A1 | * | 5/2003 | Cochrane et al. | 707/2 |

* cited by examiner

Primary Examiner—Srirama Channavajjala
Assistant Examiner—Kuen S Lu
(74) Attorney, Agent, or Firm—Marcel K. Bingham; Hickman Palermo Truong & Becker LLP

(57) ABSTRACT

A system rewrites queries so that they may be executed more efficiently. Queries that reference the result set of an aggregate query are rewritten to reference another aggregate query in the form of an inner query that omits groupings that can not possibly satisfy the criteria imposed by the predicates of the outer query. Thus, when the inner query is computed, only rows for groupings that satisfy the criteria are generated, conserving resources that would otherwise be wasted generating rows that could not possibly satisfy the criteria.

24 Claims, 6 Drawing Sheets

COLUMNS 202

| ROWS 201 | 202-1 () | 202-2 D1L1 | 202-3 D1L2 | 202-4 D1L3 | 202-5 D1L4 | 202-6 () | 202-7 D2L1 | 202-8 D2L2 | 202-9 D2L3 |
|---|---|---|---|---|---|---|---|---|---|
| 201-1 | X | X | X | X | X | X | X | X | X |
| 201-2 | X | X | X | X | X | X | X | X | |
| 201-3 | X | X | X | X | X | X | X | | |
| 201-4 | X | X | X | X | X | X | | | |
| 201-5 | X | X | X | X | | X | X | X | X |
| 201-6 | X | X | X | X | | X | X | X | |
| 201-7 | X | X | X | X | | X | X | | |
| 201-8 | X | X | X | X | | X | | | |
| 201-9 | X | X | X | | | X | X | X | X |
| 201-10 | X | X | X | | | X | X | X | |
| 201-11 | X | X | X | | | X | X | | |
| 201-12 | X | X | X | | | X | | | |
| 201-13 | X | X | | | | X | X | X | X |
| 201-14 | X | X | | | | X | X | X | |
| 201-15 | X | X | | | | X | X | | |
| 201-16 | X | X | | | | X | | | |
| 201-17 | X | | | | | X | X | X | X |
| 201-18 | X | | | | | X | X | X | |
| 201-19 | X | | | | | X | X | | |
| 201-20 | X | | | | | X | | | |

FIG. 2

GROUP PRUNING FROM CUBE, ROLLUP, AND GROUPING SETS

FIELD OF THE INVENTION

The present invention relates to query optimization, and in particular, optimizing queries by rewriting the queries.

BACKGROUND OF THE INVENTION

Storing and retrieving large amounts of data are some of the most important functions of computers in today's society. To carry out these functions, database systems are typically used to retrieve and store data in databases. Database systems developed so far have performed these functions very successfully, creating for society the ability to retrieve data at speeds and quantities previously unimagined, and giving society an unprecedented level of access to information. The success of database systems has unleashed an insatiable demand for even faster and more efficient database systems that process even greater quantities of data.

In a database management system (DBMS), data is stored in one or more data containers, such as tables. The term table is used to refer to any set of data that is processed as a set of records, each record being organized into one or more fields. In relational database systems, the records are referred to as rows, and the fields are referred to as columns. A table may be a data container with rows and columns, or the results of a query, including subqueries. A subquery is a query within a query, and shall be described later in further detail.

In object-oriented databases, the data containers correspond to object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms row and column shall be used herein to refer respectively to record and field.

Database systems retrieve information in response to receiving queries that specify the information to retrieve. In order for a database system to understand the query, the query should conform to a database language recognized by the database system, such as the ANSI Structured Query Language (SQL). To illustrate the structure of a query, the following query E1 is provided.

SELECT T.a FROM T WHERE T.b=1 and T.c=1

Query E1, when executed by a database system that supports SQL, retrieves column T.a of table T from rows containing the value 1 in column T.b of table T. The above query includes a SELECT clause (i.e. "SELECT T.a"), a FROM clause (i.e. "FROM T"), and a WHERE clause (i.e. "T.b =1 and T.c=1"). The FROM clause references one or more tables from which to retrieve values. The tables in the FROM clause are collectively referred to as the FROM list. The SELECT clause specifies one or more columns in the items in the FROM list from which to retrieve values. The one or more columns in the SELECT clause are collectively referred to as the SELECT list.

The WHERE clause specifies the rows from which the values are retrieved. Specifically, the WHERE clause contains one or more conditions defining criterion that must be met by a column(s) of the rows from which values are retrieved. The conditions in the WHERE clause are referred to as predicates. Query E1 contains the predicates "T.b=1" and "T.c=1". The term "expression" is used to refer to a logical expression based on one or more predicates. Query E1 contains the expression "T.b=1 and T.c=1". The criteria specified by the WHERE clause is referred to herein collectively as filtering criteria.

When a database system executes a query, it generates results in the form of a table. Such a table is referred to herein as a result set. The result set has the columns specified in the SELECT list of the query.

One of the most important functions for data generation and retrieval performed by a database system is the generation of aggregated information. Aggregated information is information derived by applying an aggregate function to the values in a column of a subset of rows in a "base table". Examples of aggregate functions are functions that sum values, calculate averages, and determine minimum and maximum values. The column that contains the values to which an aggregate function is applied is referred to as the measure.

The subsets of rows to which an aggregate function is applied are determined by values in a "group-by" column. The aggregate information generated by a database system is presented as a result set having the group-by column and the measure column. In particular, the result set has one row for each unique value in the group-by column. Each row in the result set corresponds to the group of rows in the base table containing the value for the group-by column of the row. The measure column in the row contains the output of the aggregate function applied to the values in the measure column of the group of rows.

Aggregate information is generated by a database system in response to receiving an aggregate query. An aggregate query specifies a group-by column, the measure column, and the aggregate function to apply to the measure values. The following query E2 is provided as an illustration.

Select d, sum(s) sum_s From t
Group by d

Table t contains data representing the sales of an organization. Each row represents a particular sales transaction. For a particular row in table t, column d contains the date of the sales transaction, and s contains the sale amount.

The SELECT clause in query E2 contains "sum(s)", which specifies that the aggregate function "sum" is to be applied to the values in column s of table t. The query E2 also includes the group-by clause "Group by d", which denotes column d as the group-by column.

Execution of query E2 generates a result set with a column for d and sum (s). A particular row in the result set represents the total sales for all sale transactions in a given day. Specifically, for a particular row in the result set, d contains a unique date value from table t for column d. Column sum_s contains the sum of the sales amount values in column s for the group of rows from t that have the unique date value in column d.

It is often useful to generate aggregate information grouped by multiple columns. For example, table t may also contain column r, a column containing values representing regions.

It is may be useful to generate a result set that summarizes sales by region, and for each region, sales date. Such a result set may be generated by referencing column r and d in the group-by clause, as illustrated by the following query E3.

```
Select d, r sum (s) from t
    group by r, d
```

Another useful way to provide aggregate information is to generate one result set that groups data by various combinations of columns. For example, a result set may contain a set of rows grouped by region and date, and a set of rows grouped only by region. Such a result set may be generated by submitting a query that includes multiple subqueries operated upon by the union operator.

The union operator is used to specify that the result set of a subquery is to be merged with the result set of another subquery. The following query E3 is used to illustrate how the union operator may be used to specify a result set that groups by multiple combinations of group-by columns.

```
        select a, b, sum(m)from t
            group by a,b
union
        select a, null, sum(m)from t
            group by a
union
        select null, b, sum(m)from t
            group by b
union
        select null, null, sum(m)
            from t
```

Query E3 specifies four subqueries, each with a group-by clause specifying a different combination of columns by which to group rows. A particular group of columns by which to group rows is referred to herein after as a grouping. The first subquery in query E3 contains the group-by clause "group by a, b", thus specifying a grouping of (a,b). The remaining subqueries respectively specify the groupings (a), (b), and ( ). "( )" denotes the grand total, specifying no group-by column.

The union operator has two operands, a table that precedes the operand and a table that follows the operand. The operands may designate any form of a table, including base tables, views, or the result set of a subquery. Generally, the subquery that precedes the first union operator in a union query dictates the number order, and data type of the columns of the result set of the union query. The remaining subqueries whose result sets are to be merged should specify the same number columns.

Execution of the query E3 generates a result set with three columns and four sets of rows. The three columns include a, b, and sum(m). The first set of rows is grouped according to (a,b), the second set according to (a), the third according (b), and the fourth according to ( ).

All rows generated for all groupings will include a column for every group-by column. However, for the rows of a particular grouping that do not include a particular group-by column, the rows contain a null value for that column. Thus, all rows for grouping (a) will contain the null value in b. All rows for the grouping (b) will contain the null value in a. All rows for the grouping ( ) will contain the null value in a and b.

While union queries may be used to generate a result set with multiple groupings, they can be very tedious to write. The programmer of the subquery must write a subquery for each desired grouping, which may become extraordinarily tedious when the number of groupings desired is relatively large.

To avoid this burden, SQL defines extended group-by operators. Extended group-by operators include cube, rollup, and grouping sets. The group-by operators are used to specifying groupings that include various combinations of the columns specified as arguments to the functions. For example, using the cube function, an equivalent query of query E1 (i.e. one that produces the same result set) may be written as follows.

```
Select a, b , sum(m) from t
    group by cube (a,b)
```

The cube function denotes that the result should reflect groupings for all possible combinations of the argument columns. Thus, the function "cube (a,b)" specifies groupings (a,b), (a), (b), and ( ).

Aggregate Queries as Inner Queries

Aggregate queries may be "inner queries". An inner query is a subquery whose result set is referenced as a table in the From clause of an "outer query". When database systems execute a query containing an outer query and an inner query, the inner query is sometimes computed first. This is typical for inner queries which are hard to merge into outer queries, like inner queries with aggregation. Consequently, the entire result set of the inner query is generated before computation of the outer query.

The predicates of the outer query may reference columns of the result set of the inner query. When the outer query is executed, the rows from the result set generated for the inner query may be filtered. Sometimes, the entire set of rows for a grouping may be eliminated. To illustrate how an entire grouping may be eliminated in this way, the following query E4 is provided.

```
select v_cube.a, v_cube.b, sum(v_cube.sum_m) sum_v_m
    from
        (select a, b, sum(m) sum_m
            from t
            group by cube (a,b)
        ) v_cube
    where v_cube.a = 10 and v_cube.b = 20;
```

The inner query includes the extended group-by operator "cube (a,b)". Computation of the inner query generates a result set with rows for groupings (a,b), (a), (b), and ( ). However, rows for groupings (a), (b), and ( ) can not possible satisfy the filtering criteria of the outer query in E4 because the rows for these groupings will contain a NULL value either in v_cube.a or v_cube.b. Therefore, rows are computed for groupings that cannot possibly satisfy criteria imposed by the outer query.

When the rows for a grouping specified by an inner query cannot possibly satisfy the criteria imposed by the outer query, computational resources are wasted generating data for rows that can not possibly affect the content of the result set of the outer query. It is therefore clearly desirable to provide a mechanism that avoids expending computational resources to generate rows for groupings that cannot possibly satisfy the criteria imposed by the predicates of the outer query.

SUMMARY OF THE INVENTION

Described herein is a system for rewriting queries so that they may be executed more efficiently. Queries that reference the result set of an aggregate query with multiple groupings are rewritten to reference another aggregate query in the form of an inner query that omits groupings that cannot possibly satisfy the criteria imposed by the predicates of the outer query. Thus, when the inner query is computed, only rows for groupings that satisfy the criteria are generated, conserving resources that would otherwise be wasted by generating rows that could not possibly satisfy the criteria.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a table depicting groupings specified by an aggregate query;

DETAILED DESCRIPTION OF THE PREFERRED EMBODIMENT

A method and apparatus for rewriting queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Described herein is a system for rewriting queries so that they may be executed more efficiently. Specifically, queries that include an outer query that references the result set of an aggregate query are rewritten so that the set of groupings specified by the aggregate query omit groupings that only produce rows than can never satisfy the predicates of the outer query. Thus, when the inner query is computed, only rows for groupings that might possibly satisfy the criteria of the outer query are generated, conserving resources that would otherwise be wasted generating rows that could not possibly satisfy the criteria.

The following terms are used herein:

The term "group pruning" refers to a process of rewriting queries to reduce the number of groupings generated by them.

The term "qualify" refers to determining that it is logically possible for the rows of a grouping to satisfy a set of criteria. Whether any rows generated for a grouping actually satisfy the criteria depends on the values in the rows for the grouping and of course the predicates on group-by columns.

The term "disqualify" refers to determining that it is logically impossible for rows generated for a grouping to satisfy a set of criteria.

Techniques for group pruning are illustrated using the following query SQ. The query SQ is composed of an outer query SO and inner query SI, which is an aggregate query. Query SO references the result set of query SI. The result set of inner query SI is assigned the alias V as shown below.

```
select D1L2, D1L3, D1L4, D2L2, D2L3, sum_s from
    (select  D1L1, D1L2, D1L3, D1L4, D2L1, D2L2, D2L3,
  sum(s)
        sum_s,
            grouping(D1L1) as gD1L1,
            grouping(D1L2) as gD1L2,
            grouping(D1L3) as gD1L3,
            grouping(D[[2]]1L4) as gD1L4,
            grouping(D1L1) as gD2L1,
            grouping(D[[1]]2L2) as gD2L2,
            grouping(D[[1]]2L3) as gD2L3
    from t
    group by rollup(D1L1, D1L2, D1L3, D1L4),
  rollup(D2L1, D2L2, D2L3)) V
  where
     ((D1L2=v0 and gD1L3=0) or (D1L3 in (v1, v2, v3))) and
     ((D2L2=v4 and D2L3=v5) or (D2L2=v6 and D2L3=v7))
```

Figure 1:
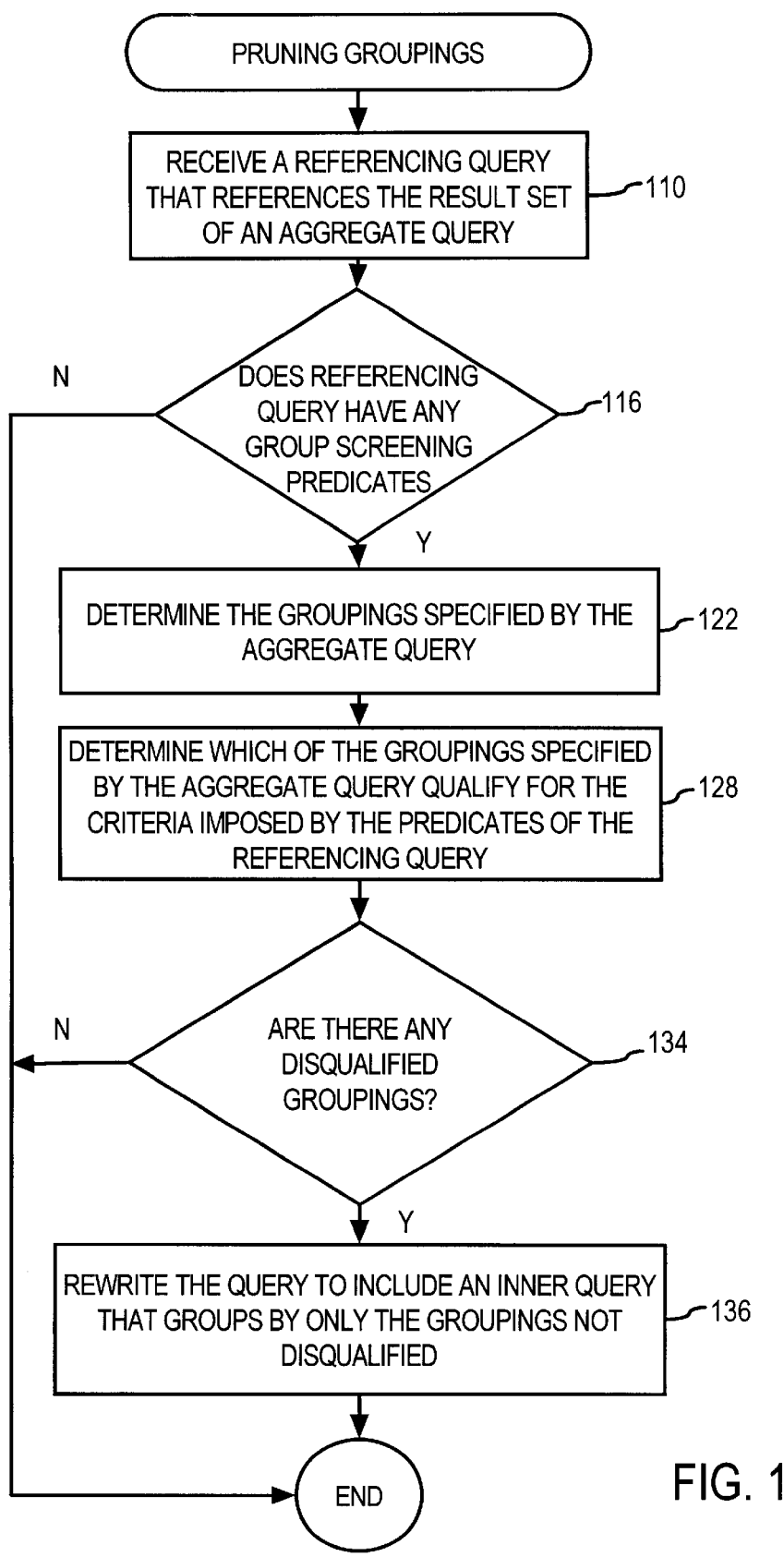
FIG. 1 is a flowchart showing an overview of a group pruning process.

FIG. 1 is a flowchart providing an overview of processes described herein for group pruning.

At step 110, a query that references the result set of an aggregate query is received. A query that references the result set of an aggregate is referred to as the referencing query. For example, outer query SO is a referencing query because outer query SO explicitly references the result set of query SI, an aggregate query SI.

At step 116, it is determined whether the referencing query has any group screening predicates. A group screening predicate is one which may possibly disqualify a grouping. Group screening predicates have a variety forms. One form imposes conditions on a group-by column. The predicate "D1L2=v0" in query SO illustrates such a predicate.

Group screening predicates may also impose conditions based on grouping functions. A grouping function indicates whether a particular row represents a grouping based on a particular group-by column. The function grouping(D1L1) (whose alias is gD1L1) indicates whether a row is for a grouping that includes column D1L1. The grouping (D1L1) evaluates to 0 if the row is for a grouping that includes column D1L1.

If it is determined that the query does not contain group screening predicates, then execution of the steps ends. In this example, query SO contains various group screening predicates, as follows.

```
D1L2=v0
gD1L3=0
D1L3 in (v1, v2, v3)
D2L2=v4
D2L3=v5
D2L2=v6
D2L3=v7
```

At step 122, it is determined what groupings are specified by the aggregate query. This is determined by examining the group-by clauses of the aggregate query to determine what group-by columns are specified. In this example, the group-by clause of inner query SI includes as arguments the extended functions rollup(D1L1,D1L2,D1L3,D1L4) and rollup(D2L1,D2L2,D2L3). The rollup function is used to specify groupings that aggregate information at each level of the hierarchy of columns specified by the arguments in the rollup function. For example, rollup (D2L1, D2L1, D2L3, D2L4) specifies the following groupings:

```
D2L1, D2L1, D2L3, D2L4
D2L1, D2L1, D2L3
D2L1, D2L1
D2L1
()
```

The group-by clause in SI includes two rollup functions. Therefore, the complete set of groupings specified by the group-by clause is the Cartesian product between the groupings specified by each of the two rollup functions.

FIG. 2 is a diagram showing a table 210, which depicts all the groupings specified by query SI. Columns 202-1 through 202-9 each correspond to a group-by column in the result set of SI. Each of rows 201 in table 210 corresponds to a particular grouping 201-1 through 201-20. For a particular grouping represented by a row in table 210, the group-by columns present in the grouping are denoted by including an "X" in the cell of the row that belongs to those columns. For example, the row for grouping 201-10 includes Xs in the cells in columns 202-1, 202- etc. because it represents the grouping (D1L1, D1L2, D2L1, D2L2).

At step 128, it is determined which of the groupings specified by the aggregate query qualify for the filtering criteria imposed by the referencing query. The determination is made by performing a process that determines which groupings are disqualified or qualified. Such a process is referred to as a pruning selection process. A variety of pruning selection processes shall be later described.

At step 134, it is determined whether there are any disqualified groupings. If there are no disqualified groupings, then execution of the steps ends. Otherwise execution of the steps proceeds to step 136.

At step 136, the referencing query is rewritten to produce an outer query that references an inner query that specifies only those groupings that have been qualified at step 134. A rewrite of query E4 (reproduced below) is provided to illustrate how a query is rewritten.

```
select v_cube.a, v_cube.b, sum(v_cube.sum_m) sum_v_m
    from
        (select a, b, sum(m) sum_m
            from t
            group by cube (a,b)
        ) v_cube
    where v_cube.a = 10 and v_cube.b = 20;
```

In query E4, the inner query is an aggregate query that specifies the groupings (a, b), (a), (b), and ( ). The groupings disqualified by the outer query in query E4 are (a), (b), ( ). A query E4 is rewritten to produce a query E5 by rewriting the inner query as follows.

```
select v_cube.a, v_cube.b, sum(v_cube.sum_m) sum_v_
    from
        (select a, b, sum(m) sum_m
```

```
            from t
            group by a,b
        ) v_cube
    where v_cube.a = 10 and v_cube.b = 20;
```

Disjunctive Normal Form

Figure 3:
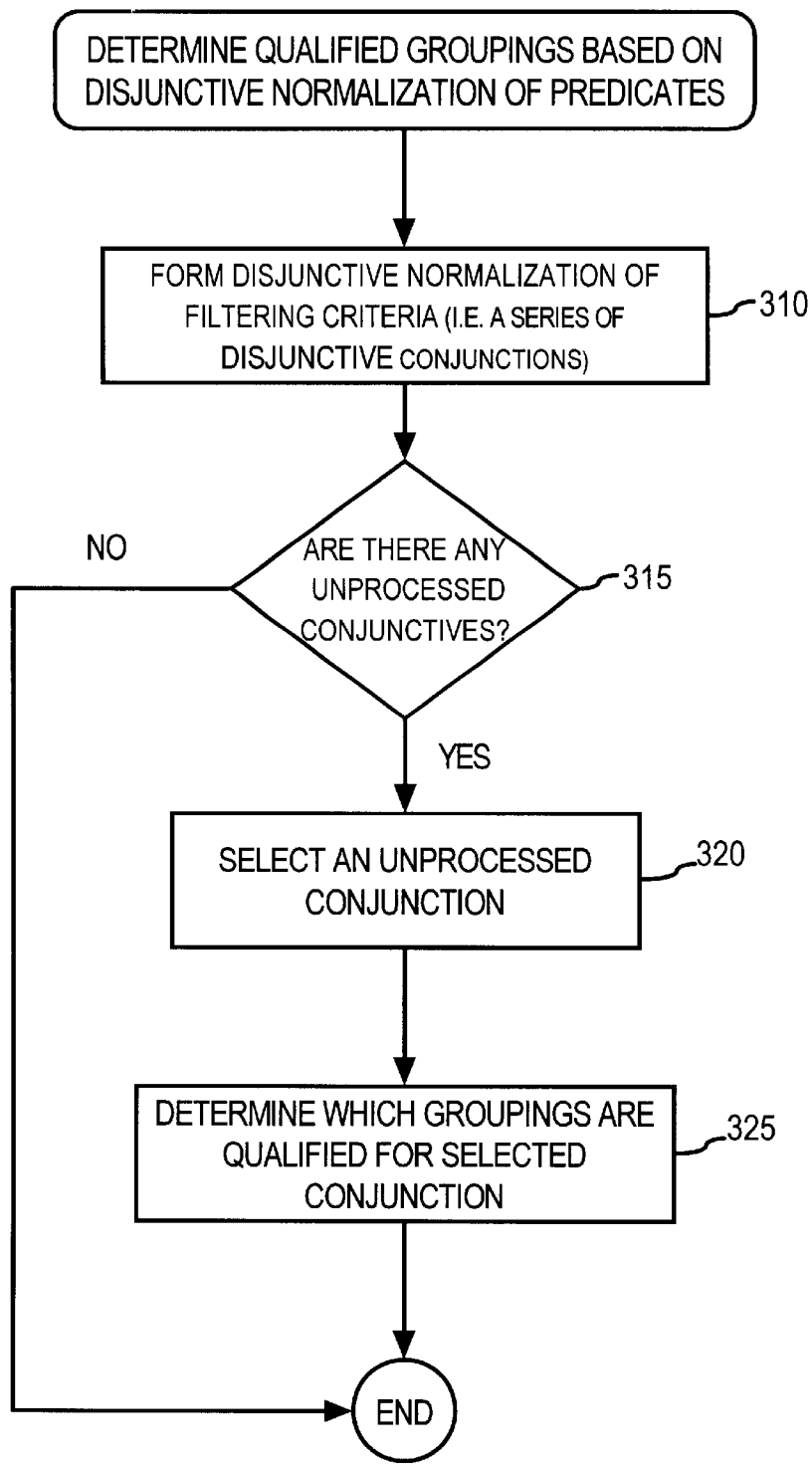
FIG. 3 is a flow chart depicting a pruning selection process based on generating the disjunctive normal form of filtering criteria.

FIG. 3 shows a group pruning selection process according to an embodiment of the present invention. The process is based on forming an expression that is a disjunctive normalization of the filtering criteria in the referencing query. Disjunctive normalization of a boolean AND/OR/NOT expression is well known to those skilled in the art. When the process is initiated, it is assumed that all groupings are disqualified. The disjunctive normalization is examined to determine which groupings are qualified.

Referring to FIG. 3, at step 310, a disjunctive normalization of the filtering criteria of the referencing query is formed. Specifically, the filtering criteria is normalized into a disjunctive normal form by converting the predicate expressions into a series of expressions joined by disjunctive operators, where each expression in the series is a conjunction, that is, one or more predicates joined by conjunctive operators. The disjunctive normal form of the predicates in SO are as follows.

```
(D1L2=v0 and gD1L3=0 and D2L2=v4 and D2L3=v5) or
(D1L2=v0 and gD1L3=0 and D2L2=v6 and D2L3=v7) or
(D1L3 in (v1, v2, v3) and D2L2=v4 and D2L3=v5) or
(D1L3 in (v1, v2, v3) and D2L2=v6 and D2L3=v7)
```

Steps 315 through 325 form a loop which iteratively processes conjunctions in the disjunctive normalization. At step 315, it is determined whether there are any unprocessed conjunctions. If there are none, then execution of the steps ends. Otherwise, execution of the steps flows to steps 320, where an unprocessed conjunction is selected.

At step 325, it is determined which groupings are qualified by the selected conjunction. For the purposes of pruning groupings, once a grouping has been determined to be qualified, it is thereafter treated as qualified. If a grouping is not selected in any iteration of the loop, it is treated as disqualified.

In this example, in the first iteration of the loop, the following conjunction is selected.

(D1L2=v0 and gD1L3=0 and D2L2=v4 and D2L3=v5)

At step 320, the groupings are examined to determine which are qualified for the selected conjunction. The predicate gD1L3=0 requires the presence of D1L3 in a grouping. Only groups 201-1 through 201-8 are qualified for the predicate.

The predicate D2L2=v4 requires the presence of D2L2 in a grouping. Thus, of the groups 201-1 through 201-8, only groups 201-1, 201-2, 201-5, and 201-6 are qualified for the predicate.

The predicate D2L3=v5 requires the presence of D2L3 in a grouping. Thus, of groups 201-1, 201-2, 201-5, and 201-6, only the groups 201-1 and 201-5 are qualified for the predicate. Therefore, groups 201-1 and 201-5 are selected as qualified in this iteration of step 325.

After iterating through all the conjunctions, only groups 201-1 and 201-5 have been selected as qualified. These groupings are denoted below.

---
(D1L1, D1L2, D1L3, D2L1, D2L2, D2L3),
(D1L1, D1L2, D1L3, D1L4, D2L1, D2L2, D2L3)

---

Groupings 201-1 and 201-5 are treated as qualified and the remaining groupings 201 are not qualified for purposes of rewriting query SI. Referring to FIG. 1, at step 134, it is determined that groupings have been qualified. Therefore, at step 136, the referencing query is rewritten by modifying the group-by clause of SI to form query SQRW, shown below.

---
```
select D1L2, D1L3, D1L4, D2L2, D2L3, sum_s from
    (select D1L1, D1L2, D1L3, D1L4, D2L1, D2L2, D2L3,
        sum(s) sum_s,
        grouping(D1L1) as gD1L1,
        grouping(D1L2) as gD1L2,
        grouping(D1L3) as gD1L3,
        grouping(D[[2]]1L4) as gD1L4,
        grouping(D1L1) as gD2L1,
        grouping(D[[1]]2L2) as gD2L2,
        grouping(D[[1]]2L3) as gD2L3
    from t
    group by grouping set
        (
        (D1L1, D1L2, D1L3, D2L1, D2L2, D2L3),
        (D1L1, D1L2, D1L3, D1L4, D2L1, D2L2, D2L3)
        )
```
---

Qualifying Patterns

Another group pruning selection process involves generating qualifying patterns that describe qualifying groupings. These patterns may be logically represented as bitmaps with ternary bits. Each bit position in the bitmap corresponds to a group-by column of an aggregate query. The value in a bit position specifies whether the corresponding group-by column must be present in a qualifying grouping, must not be present, or may or may not be present. The following grouping GA, and qualifying patterns GB1 and GB2 are provided as an illustration.

---
GA = (a, b, c)
GB1 = 1X0
GB2 = 1X1

---

For GB1, the first bit pattern specifies that column a should be present, as indicated by value 1, the second bit that b may or may not be present, as indicated by value x, and the third that c should not be present, as indicated by value 0. GA includes a, b, c. Because c is included, GA does not qualify for GB1.

For GB2, the first bit specifies that column a should be present, the second bit that b may or may not be present, and the third that c should be present. GA includes a, b, c, and therefore qualifies for GB2.

A qualifying pattern may also be represented as a pair of bitmaps with binary bits. A pair of bits at the same position in the bitmaps may have the following values: 1/1, 0/1, and 0/0. 1/1 denotes that the corresponding column must be present in the qualifying grouping; 0/1 specifies that the corresponding column should not be present; 0/0 specifies that the corresponding column may or may not be present. The following pair of bitmaps GB3 and GB4 are equivalent to GB1 as representations of qualifying patterns.

---
GB1 = 1X0
GB3 = 100
GB4 = 110

---

Generating Qualifying Patterns

Figure 4:
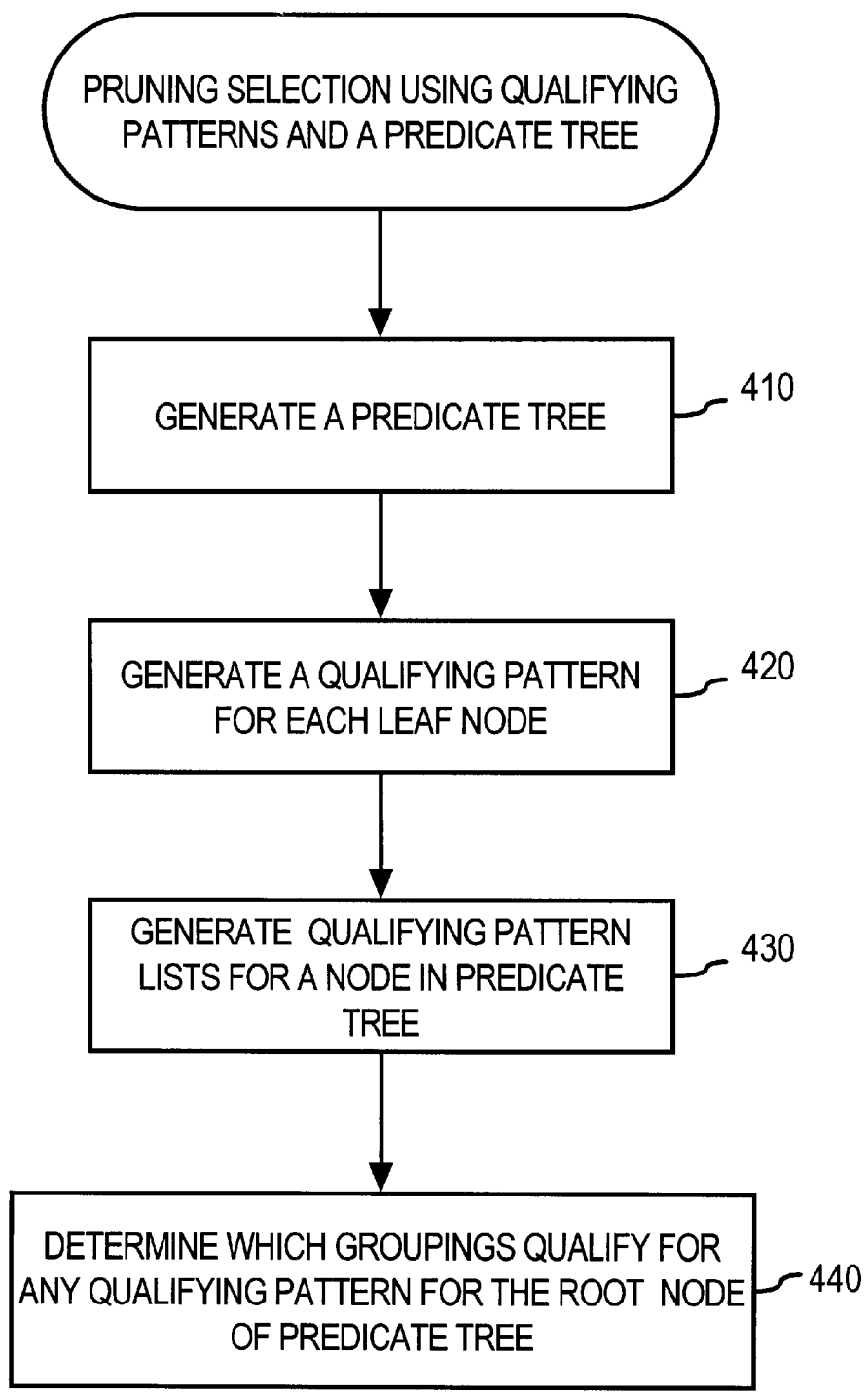
FIG. 4 is a flow chart depicting a pruning selection process based on generating a predicate tree of the filtering criteria.

FIG. 4 is a flowchart showing a process for generating patterns that describe groupings qualified by the filtering criteria of a referencing query. The patterns are computed by generating a predicate tree based on the filtering criteria and generating qualifying patterns for each predicate in the tree. The predicate tree and the qualifying patterns are examined to derive a list of qualifying patterns that describe all qualifying groups for the filtering criteria.

The process depicted in FIG. 4 is illustrated using the following query QPQ shown below.

---
```
select a, b, c, d, sum_m
    from (
        select a, b, c, d,
            grouping(a) ga, grouping(b) gb,
            grouping(c) gc, grouping(d) gd,
            sum(m) sum_m
        from T
        group by grouping sets((a, b, c, d), (a, b),
(a, b, d))
    ) V
    where
        (a>3) AND (b>1 OR b=0) AND (gc=1 OR (gc=0 AND
        d>0) OR (c=0 and d<0));
```
---

Query QPQ yields the following groupings shown in table T1.

TABLE T1

| GROUPING |
|---|
| (a, b, c, d) |
| (a, b, c) |
| (a, b,    d) |
| (a,    c, d) |
| (   b, c, d) |
| (a, b      ) |
| (a,    c) |
| (a,       d) |
| (   b, c) |
| (   b,    d) |
| (      c, d) |
| (a) |
| (   b) |
| (      c) |
| (         d) |
| ( ) |

Referring to FIG. 4, at step 410, a predicate tree is generated for the filtering criteria of the referencing query. A predicate tree for the filtering criteria of a query is a node graph with leaf nodes and parent nodes. Leaf nodes have no branches extending from them, parent nodes have branches extending to child nodes. A child node may be a leaf node or another parent node. The leaf nodes of a predicate tree correspond to the predicates. The parent nodes correspond to conjunctive and disjunctive operators of conjunctive and disjunctive expressions in the filtering criteria. The predicate tree generated for the current example is shown in FIG. 5.

Figure 5:
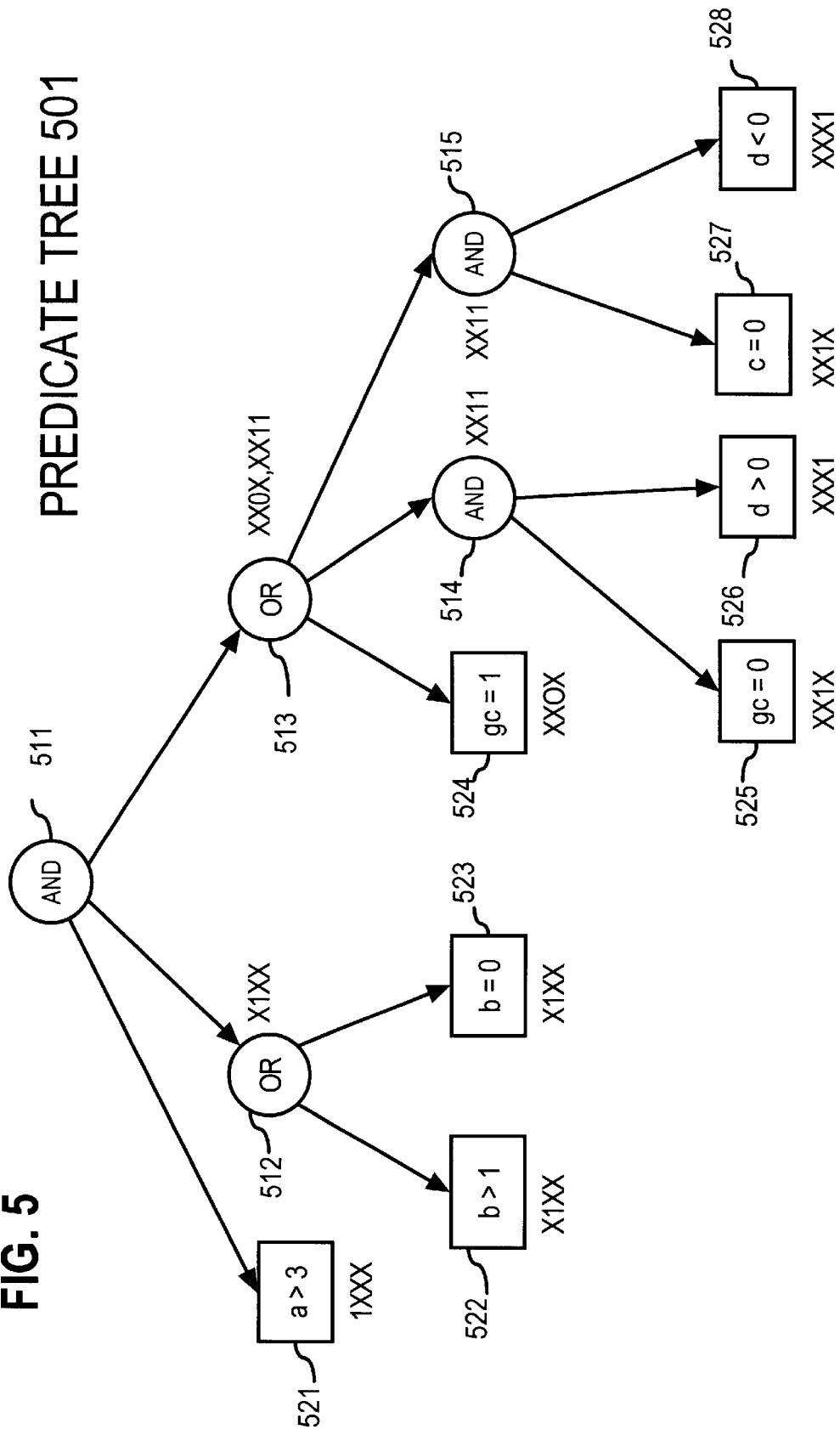
FIG. 5 is a diagram depicting a predicate tree according to an embodiment of the present invention.

FIG. 5 is a graph that shows predicate tree 501 for the filtering criteria of query QPQ. Predicate tree 501 includes leaf nodes 521, 522, 523, 524, 525, 526, 527, and 528, each of which corresponds to a predicate in the filtering criteria as denoted in FIG. 5. For example, leaf node 522 corresponds to the predicate b>1 and leaf node 523 to b=0.

Parent nodes 511, 512, 513, 514, and 515 correspond to disjunctive and conjunctive operators between disjunctive and conjunctive expressions in the filtering criteria. Node 512 corresponds to the OR operator for the predicate expression (b>1 OR b=1). The node at the root of a predicate tree is referred to as the root node. Thus, node 511 is the root node for predicate tree 501.

At step 420, a qualifying pattern is generated for each leaf node in the predicate tree.

The qualifying pattern generated for a leaf node describes the groupings that qualify for the predicate of the leaf node. The pattern generated for each of the leaf nodes is shown in FIG. 5. For example, the qualifying pattern generated for leaf node 521 is 1xxx, and for leaf node 525 is xx1x.

At step 430, a qualifying pattern list is generated for each of the parent nodes. The list describes the groupings that would be qualified by the expression formed by the operator that corresponds to the leaf node.

The qualifying patterns for the parent nodes are created recursively, beginning with the root node. If a parent node corresponds to an OR operator, then the qualifying pattern is simply the list of non-redundant qualifying patterns of child nodes. If the node corresponds to the AND operator, then the list of qualifying patterns are those that satisfy all the qualifying patterns of the child nodes. If the qualifying pattern list of a child node has not been created, then it is generated before creating the list for the parent node. At the end of this step, the qualifying pattern list created for the root node defines the groupings that are qualified by the filtering criteria.

In this example, the qualifying pattern list is formed according to the description in the following Table T2. Each entry in Table T2 corresponds to a parent node in predicate tree 501. For a particular parent node, the first column in Table T2 lists the parent node's child nodes and their qualifying patterns. The second column describes how the qualifying pattern is generated for the parent node. The qualifying pattern list generated for each of the parent nodes is shown in FIG. 5. For example, the grouping pattern list for parent node 513 is xx0x, At step 440, it is determined which groupings specified by the aggregate query are qualified by any patterns created for the root node. In this example, the qualifying patterns for root node 511 are (110x, 1111). Among the 16 groupings specified by query QPQ, only three are qualified by (110x, 1111). Specifically, (a, b) and (a,b,d) are qualified by (110x), and (a,b,c,d) is qualified by (1111).

At step 136, query QPQ is rewritten to QPQRW, as follows.

```
select a, b, c, d, sum_m
    from (
        select a, b, c, d,
            grouping(a) ga, grouping(b) gb,
            grouping(c) gc, grouping(d) gd,
            sum(m) sum_m
        from T
        group by grouping sets ((a, b, c, d), (a, b),
            (a, b, d))
    ) V
    where
        (a>3) AND (b>1 OR b=0) AND (gc=1 OR (gc=0
AND d>0) OR (c=0 and d<0)
```

Hardware Overview

Figure 6:
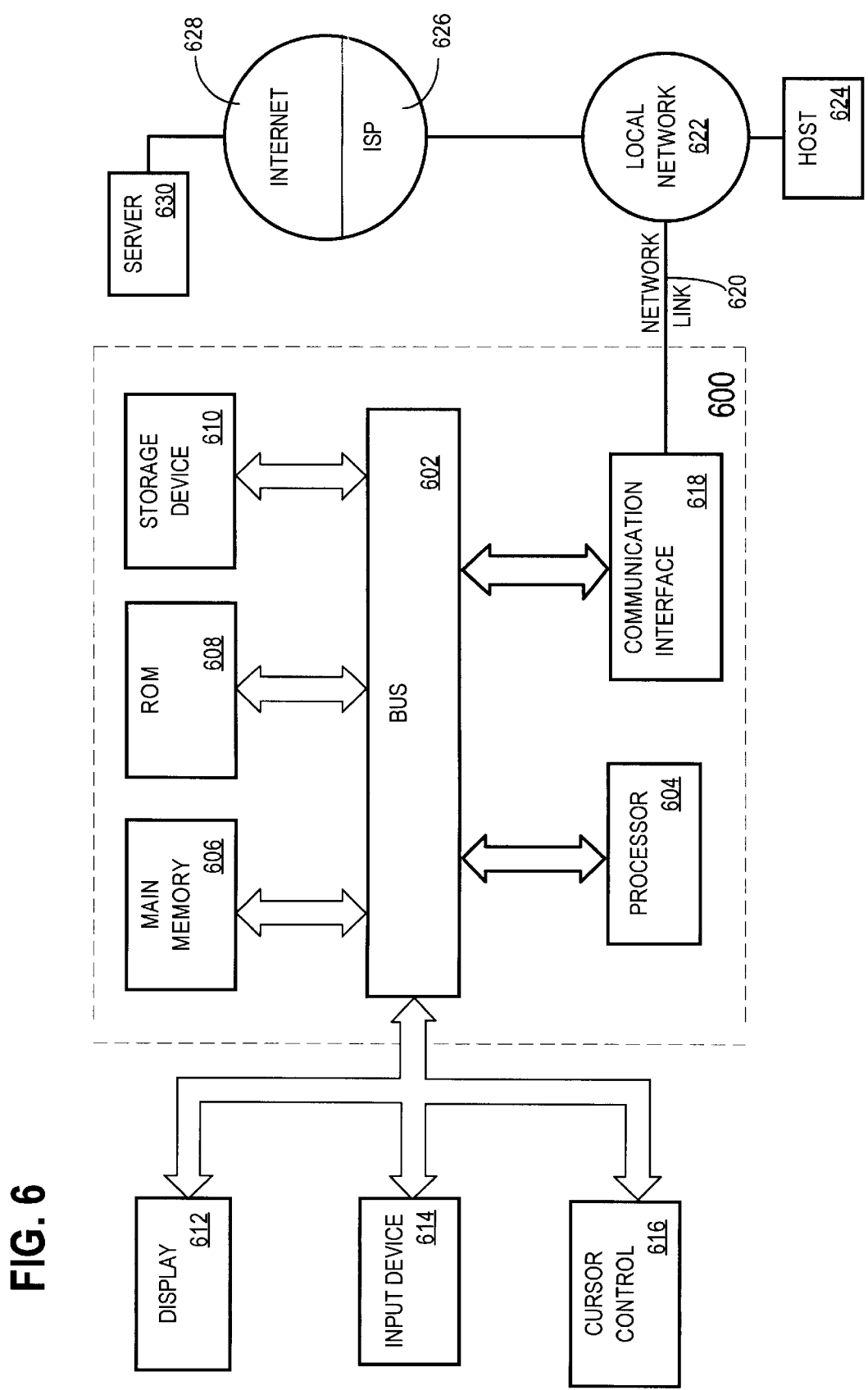
FIG. 6 is a block diagram of a computer system upon which an embodiment of the present invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, includ-

TABLE T2

| | |
|---|---|
| Parent Node 512, has child nodes: | Qualifying pattern list is simply all the non-redundant |
| Node 522 (xx1x) | qualifying patterns of the child, i.e. |
| Node 523 (xx1x) | (x1xx) OR (x1xx) => (x1xx) |
| Parent Node 514, has child nodes: | Qualifying patterns list are those do not conflict with |
| Node 525 (xx1x) | the patterns of all the child nodes, i.e. |
| Node 526 (xxx1) | xx1x AND xxx1 => (xx11) |
| Parent Node 515, has child nodes: | xx1x AND xxx1 => (xx11) |
| Node 527 (xx1x) | |
| Node 538 (xxx1) | |
| Parent Node 513, has child nodes: | (xx0x) OR (xx11) OR (xx11) => xx0x OR xx11 |
| Node 524 (xx0x) | |
| Node 514 (xx11) | |
| Node 515 (xx11) | |
| Root Node 511 has child nodes: | (1xxx) AND (x1xx) AND (xx0x, xx11) => |
| Node 521 (1xxx) | (11xx) AND (xx0x, xx11)=> |
| Node 512 (x1xx) | ((11xx AND xx0x)) OR ((11xx AND xx11) => |
| Node 513 (xx0x, xx11) | (110x) OR (1111) => |
| | (110x, 1111) | ing alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622.

For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing queries, the method comprising the steps of:
   receiving a particular query that operates on a result set of an aggregate query, wherein the aggregate query specifies an operation for computing the result set such that the result set groups rows by groupings of columns that include a first grouping;
   determining whether the particular query specifies criteria that qualifies a subset of said groupings that does not include said first grouping; and
   if the particular query specifies criteria that qualifies a subset of said groupings that does not include said first grouping, then rewriting said aggregate query to produce a rewritten query that generates a result set that groups rows by said subset of groupings.

2. The method of claim 1,
   wherein said criteria is based on one or more expressions in said particular query that are based on a plurality of predicates; and
   wherein the step of determining includes examining said plurality of predicates to determine whether the particular query specifies criteria that qualifies said subset of said groupings.

3. The method of claim 2, further including the step of generating another set of expressions representing a disjunctive normal form of said one or more expressions;
   wherein said set of expressions includes one or more conjunctions;
   wherein the subset of groupings includes a second grouping; and
   wherein the step of determining whether the particular query specifies criteria that qualifies a subset of said groupings includes the step of determining that said second grouping is qualified by at least one of said one or more conjunctions.

4. The method of claim 3, wherein the step of determining whether the particular query specifies criteria that qualifies a subset of said groupings includes determining that no conjunction of said one or more conjunctions qualifies said first grouping.

5. The method of claim 1, wherein the step of determining includes the step of generating a first set of patterns that describe one or more groupings that are qualified by said criteria.

6. The method of claim 5, wherein the step of determining includes determining that each grouping of said subset of groupings is qualified by at least one of pattern of said first set of patterns.

7. The method of claim 5, wherein each pattern of said first set of patterns indicates the particular columns in a qualified grouping that must be present, must not be present, or may or may not be present.

8. The method of claim 7, wherein each pattern of said first set of patterns is represented by a pair of bitmaps with bit positions that correspond to group-by columns of said result set.

9. The method of claim 5,
   wherein said criteria is based on one or more expressions in said particular query that are based on a plurality of predicates; and
   wherein the step of determining includes:
      generating a predicate tree based on said one or more expressions;
      wherein said predicate tree includes leaf nodes and parent nodes, wherein each leaf node of said leaf nodes corresponds to a particular predicate of said plurality of predicates and each parent node of said parent nodes corresponds to a particular expression of said one or more expressions;
      generating for each leaf node of said leaf nodes a pattern describing one or more groupings that qualify for the predicate corresponding to said each leaf node;
      generating for each parent node of said parent nodes one or more patterns describing one or more groupings that qualify for the expression corresponding to said each parent node; and
      wherein said parent nodes include a root node that corresponds to said first set of patterns.

10. The method of claim 1, wherein said aggregate query is an inner query of said particular query.

11. The method of claim 1, wherein said aggregate query includes one or more functions for specifying groupings including the rollup function, cube function, or grouping set function.

12. A method for processing queries, the method comprising the steps of:
   receiving a particular query that includes an outer query that references the result set of an aggregate query;
   wherein said aggregate query specifies a set of groupings;
   wherein said outer query includes one or more predicates; and
   rewriting said particular query to produce a rewritten query that omits one or more groupings from said set of groupings that only produce rows that can never satisfy said one or more predicates of the outer query.

13. A computer-readable medium carrying one or more sequences of instructions for processing queries, wherein execution of the one or more sequences of instructions by one or more processors causes the one or more processors to perform the steps of:
   receiving a particular query that operates on a result set of an aggregate query, wherein the aggregate query specifies an operation for computing the result set such that the result set groups rows by groupings of columns that include a first grouping;
   determining whether the particular query specifies criteria that qualifies a subset of said groupings that does not include said first grouping; and
   if the particular query specifies criteria that qualifies a subset of said groupings that does not include said first grouping, then rewriting said aggregate query to produce a rewritten query that generates a result set that groups rows by said subset of groupings.

14. The computer-readable medium of claim 13,
   wherein said criteria is based on one or more expressions in said particular query that are based on a plurality of predicates; and
   wherein the step of determining includes examining said plurality of predicates to determine whether the particular query specifies criteria that qualifies said subset of said groupings.

15. The computer-readable medium of claim 14, the steps further including the step of generating another set of expressions representing a disjunctive normal form of said one or more expressions; wherein said set of expressions includes one or more conjunctions;
   wherein the subset of groupings includes a second grouping; and
   wherein the step of determining whether the particular query specifies criteria that qualifies a subset of said groupings includes the step of determining that said second grouping is qualified by at least one of said one or more conjunctions.

16. The computer-readable medium of claim 15, wherein the step of determining whether the particular query specifies criteria that qualifies a subset of said groupings includes determining that no conjunction of said one or more conjunctions qualifies said first grouping.

17. The computer-readable medium of claim 13, wherein the step of determining includes the step of generating a first set of patterns that describe one or more groupings that are qualified by said criteria.

18. The computer-readable medium of claim 17, wherein the step of determining includes determining that each grouping of said subset of groupings is qualified by at least one of pattern of said first set of patterns.

19. The computer-readable medium of claim 17, wherein each pattern of said first set of patterns indicates the particular columns in a qualified grouping that must be present, must not be present, or may or may not be present.

20. The computer-readable medium of claim 19, wherein each pattern of said first set of patterns is represented by a pair of bitmaps with bit positions that correspond to group-by columns of said result set.

21. The computer-readable medium of claim 17,
wherein said criteria is based on one or more expressions in said particular query that are based on a plurality of predicates; and
wherein the step of determining includes:
generating a predicate tree based on said one or more expressions;
wherein said predicate tree includes leaf nodes and parent nodes, wherein each leaf node of said leaf nodes corresponds to a particular predicate of said plurality of predicates and each parent node of said parent nodes corresponds to a particular expression of said one or more expressions;
generating for each leaf node of said leaf nodes a pattern describing one or more groupings that qualify for the predicate corresponding to said each leaf node;
generating for each parent node of said parent nodes one or more patterns describing one or more groupings that qualify for the expression corresponding to said each parent node; and
wherein said parent nodes include a root node that corresponds to said first set of patterns.

22. The computer-readable medium of claim 13, wherein said aggregate query is an inner query of said particular query.

23. The computer-readable medium of claim 13, wherein said aggregate query includes one or more functions for specifying groupings including the rollup function, cube function, or grouping set function.

24. A computer-readable medium carrying one or more sequences of instructions for processing queries, wherein execution of the one or more sequences of instructions by one or more processors causes the one or more processors to perform the steps of:
receiving a particular query that includes an outer query that references the result set of an aggregate query;
wherein said aggregate query specifies a set of groupings;
wherein said outer query includes one or more predicates; and
rewriting said particular query to produce a rewritten query that omits one or more groupings from said set of groupings that only produce rows that can never satisfy said one or more predicates of the outer query.

* * * * *